United States Patent
Yang et al.

(10) Patent No.: US 7,161,640 B2
(45) Date of Patent: Jan. 9, 2007

(54) SHIELD JUNCTION THIN FILM TRANSISTOR STRUCTURE

(75) Inventors: Kei-Hsiung Yang, Taoyuan Hsien (TW); Po-Sheng Shih, Taoyuan Hsien (TW)

(73) Assignee: HannStar Display Corporation, Taipei (TW)

( * ) Notice: Subject to any disclaimer, the term of this patent is extended or adjusted under 35 U.S.C. 154(b) by 255 days.

(21) Appl. No.: 10/918,983

(22) Filed: Aug. 16, 2004

(65) Prior Publication Data

US 2005/0146648 A1 Jul. 7, 2005

(30) Foreign Application Priority Data

Jan. 7, 2004 (TW) .............................. 93100375 A

(51) Int. Cl.
*G02F 1/136* (2006.01)
(52) U.S. Cl. .............................. 349/43; 349/46; 257/59; 430/30
(58) Field of Classification Search ............ 349/43–46; 257/59; 430/30
See application file for complete search history.

(56) References Cited

U.S. PATENT DOCUMENTS 5,838,037 A * 11/1998 Masutani et al. ........... 257/296
6,219,118 B1 * 4/2001 Zhang ......................... 349/110
6,927,809 B1 * 8/2005 Gotoh et al. ................. 349/44
2003/0197182 A1 * 10/2003 Kim et al. ..................... 257/72
2005/0110716 A1 * 5/2005 Eida ............................. 345/76
2005/0112876 A1 * 5/2005 Wu et al. ..................... 438/685

FOREIGN PATENT DOCUMENTS

JP 404069622 * 3/1992

* cited by examiner

*Primary Examiner*—Huyen Ngo
(74) *Attorney, Agent, or Firm*—Thomas, Kayden, Horstemeyer & Risley

(57) ABSTRACT

The present invention provides a Shield-Junction thin film transistor structure. According to the structure of the present invention, on top of the passivation layer, there is an island of protection electrode electrically insulated from the bottom ITO electrode. The protection electrode electrically connects with the gate line through a via hole and covers part of the drain electrode and its adjacent part of the TFT channel. Since the protection electrode does not cover or overlap with the source electrode, it has a negligible contribution to the data-line capacitance.

26 Claims, 7 Drawing Sheets

SHIELD JUNCTION THIN FILM TRANSISTOR STRUCTURE

FIELD OF THE INVENTION

This invention relates to a thin film transistor array for use in electromagnetic imaging devices and liquid crystal display (LCD) devices. More particularly, this invention relates to a thin film transistor structure having a shielded-junction structure to reduce the data-line capacitance and maintain low leakage current of thin film transistor at the off-state and so as to improve the signal-to-noise ratio and reduce the dosage of the electromagnetic radiation for imaging.

BACKGROUND OF THE INVENTION

The use of two-dimensional arrays of thin film transistors for radiation detection is well known in the prior arts. One prior art X-ray imaging detector, Multi-Element Amorphous Silicon Detector Array (MEASDA), has been provided. In this prior art detector, a scintillation material (e. g., phosphor screen or CsI) converts X-rays directly into light. The light then impinges on and partially absorbed by an array of a-Si:H photodiodes that convert the absorbed light into charge in proportional amount of absorbed light. The light-generated charges are stored on a storage capacitor and are read out through an adjacent thin film transistor as each line of the detector array is addressed.

Another prior art detector, Selenium Active Matrix Universal Read-out Array Imager (SAMURAI), has also been developed. In this prior art, the X-rays impinging on a selenium layer that converts the absorbed X-ray directly into charges. The generated charges are stored on a storage capacitor and are read out through an adjacent thin film transistor as each line of the detector array is addressed.

Both the prior arts MAESDA and SAMURAI devices require measurement of charges (or integrated current), that is proportional to impinging X-ray intensity, for each addressed row of the array. The signal-to-noise ratio of either MAESDA or SAMURAI device is, in ideal situation, proportional to the ratio of the generated charges to the noise-equivalent charges of the readout electronics. The noise-equivalent charges of the readout electronics are a product of noise of operational amplifier and the ratio of data-line capacitance to the feedback capacitance of the operational amplifier. The detailed explanation of the noise-equivalent charges of the readout electronics will be explained in the later section.

It is the purpose of this invention to improve the signal-to-noise ratio of either MAESDA or SAMURAI device by reducing the data-line capacitance and maintaining low current leakage through switching thin film transistor at the off state. One of the advantages of a higher signal-to-noise ratio is the reduction of X-ray dosage on a receiving patient so as to reduce the risk of X-ray exposure. The other advantage is to improve the image quality for better diagnostic accuracy by a physician who uses the images derived from the X-ray detector based on either MAESDA or SAMURAI.

The two-dimensional arrays of thin film transistors for radiation detection consists, typically, a switching or isolation device such as a thin film transistor associated with each element or pixel to permit individual pixels in the imager to be selectively addressed. FIG. 1 depicts the scheme of a pixel layout 140 of a prior art (the type of SAMURAI) that consists of a gate addressing line 112, a data line 110, a ground line 120, a bottom ITO (indium-tin oxide) layer 124 connected to the ground line 120 through a via hole 122, a top ITO (indium-tin oxide) layer 126 insulated from the bottom ITO by an insulating layer or a plurality of insulating layers, and the bottom-gate thin film transistor 100.

The structure of a bottom-gate thin film transistor 100 associated with each imaging element or pixel typically includes a source electrode 116 connected to the data line 110, a drain electrode 118 connected to the top ITO 126 through a via hole 123, a gate electrode 119 connected to the gate line 112, and an island of thin-film amorphous silicon (a-Si:H or other semiconductor material) 114 electrically insulated from the gate electrode 119. A thin film transistor channel 130 (part of amorphous silicon island 114) exists between the source electrode 116 and the drain electrode 118. The gate electrode 119 is placed directly below the channel 130 with an electrically insulated layer (gate insulator) placed between the gate electrode 119 and the amorphous silicon island 114. The top ITO 126 is electrically insulated from the gate line 112, the data line 110, and the ground line 120.

The charges stored in the top ITO layer 126 can be detected by a peripheral circuit 500 (shown in FIG. 7) connected to the data line 110 by turning the channel 130 into a conducting state. One example of the peripheral circuit 500 is shown in FIG. 7 where the data line 400 (equivalent to the data line 110 of FIG. 1) has a data-line capacitance, $C_{data}$. The first stage 500 also consists of an operational amplifier 600 that has a noise of An, and a feedback capacitor 300 with a capacitance of $C_f$. The noise-equivalent charges, Qn, of the readout electronics can be expressed approximately as $$Qn = An(1 + C_{data}/C_f)$$

The reduction of $C_{data}$ is an effective way to decrease Qn, thus improve the signal-to-noise ratio of the electromagnetic imaging device. Two of the major contributors to $C_{data}$ come from the capacitances between the source electrode 116 and the gate electrode 119 and between the source electrode 116 and the bottom ITO 124 or the top ITO 126 shown in FIG. 1.

FIG. 2 illustrates a cross-sectional view of the thin film transistor 100 along the line AB shown in FIG. 1. The gate electrode 119 is deposited on top of a supporting substrate preferably a glass plate 1. A gate insulating layer 5 and the amorphous silicon island 114 are deposited on top of the gate electrode 119. There exits a thin carrier-doped amorphous silicon layer 45 between the silicon island 114 and both the drain electrode 118 and the source electrode 116 to form good ohmic contacts. There usually exits a dielectric passivation layer 22 covering the source electrode 116, the drain electrode 118, and the channel 130. Current flow through the thin film transistor between the source electrode 116 and the drain electrode 118 is controlled by a voltage applied to the gate electrode 119.

One of the prior arts such as described in U.S. Pat. No. 6,011,274 to reduce the capacitance between the source electrode 116 and the top ITO 126 is shown in FIG. 2 where the source electrode 116 and the top ITO 126 are separated by two dielectric layers 22 and 23. The dielectric layer 22 is usually inorganic material such as silicon nitride of about 100 to 500 nm in thickness, and the dielectric layer 23 is usually made of organic material with a thickness from 1.5 to about 3 microns depending on its dielectric constant. The thick organic dielectric layer 23 is very effective to reduce the capacitance between the source electrode 116 and the top ITO electrode 126. Another important function of two dielectric layers 22 and 23 is to prevent the thin film transistor channel 130 from turn-on by the electric field generated by the charges stored on the top ITO electrode 126. In this way, the leakage current of thin film transistor at the off state can maintain at a low value. However, it is expensive to fabricate the thick organic dielectric layer 23 due to costs on material and process as well as low yield.

Another prior art as shown in Patent Application Publication US 2003/0010922 A1 demonstrates another way to prevent the thin film transistor channel 130 from turn-on by the electric field generated by the charges stored on the top ITO 126. FIG. 4 illustrates a cross-sectional view of the thin film transistor 101 along the line AB shown in FIG. 3. The basic idea of this prior art is illustrated in FIGS. 3, and 4, where the bottom ITO 124 shown in FIG. 1 has an extended portion into 124a shown in FIGS. 3 and 4 to cover the thin film transistor channel 130 with a dielectric passivation layer 22 between the extended portion 124a and the channel 130. In operation of the thin film transistor array, the bottom ITO 124a and 124 are connected to ground potential so that the thin film transistor channel 130 is well shielded from the charges stored at the top ITO electrode 126. However, the capacitance between the source electrode 116 and the bottom ITO 124a is rather large implying a high noise-equivalent charges, Qn, of the readout electronics.

Accordingly, a low data-line capacitance and a low leakage current of thin film transistor in the off state are important in improving overall signal-to-noise ratio of the radiation imager.

SUMMARY OF THE INVENTION

In accordance with the foregoing description, the typical thin film transistor structure for a radiation imager has a larger capacitor between the source electrode and the bottom ITO to cause a larger noise-equivalent charges, $Q_n$, of the readout electronics. Therefore, the main purpose of the present invention is to provide a shield-junction thin film transistor structure to reduce the capacitor between the source electrode and the bottom ITO.

The present invention provides a shielded-junction thin film transistor structure. The gate electrode is deposited on top of a supporting substrate preferably a glass plate. A gate insulating layer and the amorphous silicon island are deposited on top of the gate electrode. There exits a thin carrier-doped amorphous silicon layer between the silicon island and both the drain electrode and the source electrode to form good ohmic contacts. There usually exits a dielectric passivation layer covering the source electrode, the drain electrode, and the channel. On top of the passivation layer there is an island of ITO electrode electrically insulated from the bottom ITO electrode. The ITO electrode covers part of the drain electrode and its adjacent part of the thin film transistor channel. The ITO electrode is connected to the gate line through a via hole. Since ITO electrode does not cover or overlap with the source electrode, it has a negligible contribution to the data-line capacitance.

BRIEF DESCRIPTION OF THE DRAWINGS

The foregoing aspects and many of the attendant advantages of this invention will become more readily appreciated and better understood by referencing the following detailed description, when taken in conjunction with the accompanying drawings, wherein.

DETAILED DESCRIPTION OF THE PREFERRED EMBODIMENT

Figure 5:
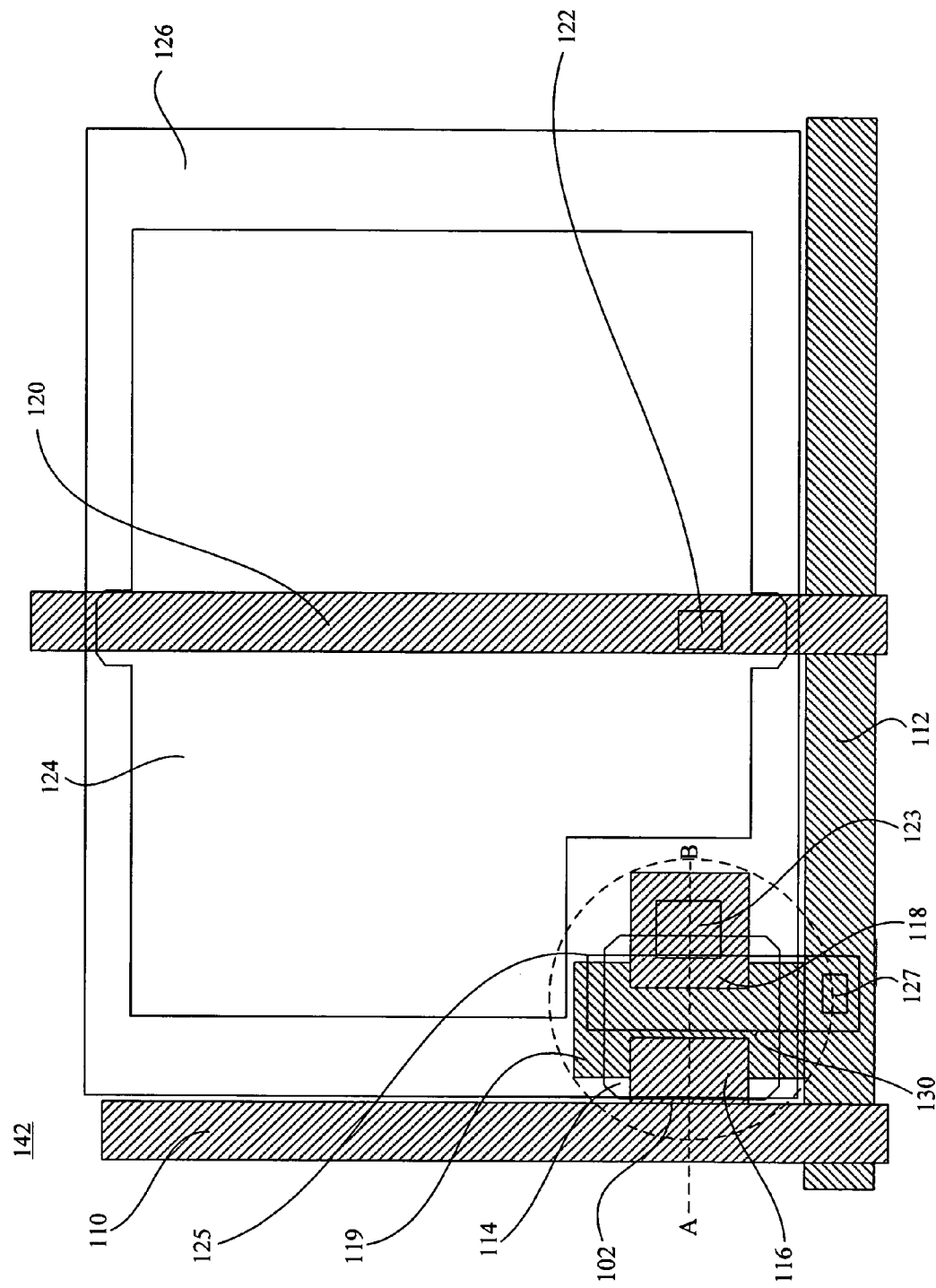
FIG. 5 depicts the scheme of a pixel layout of shielded-junction thin film transistor according to the present invention for the type of SAMURAI that includes a shielded-junction thin film transistor, a data line, a gate line, a ground line, and two ITO (indium-tin oxide) layers to form a storage capacitor.

FIG. 5 depicts the scheme of a pixel layout 142 of a shielded-junction thin film transistor array of present invention to have a low data-line capacitance and maintain a low leakage current of the shielded-junction thin film transistor at the off state for electromagnet radiation imager (for the type of SAMURAI).

Figure 7:
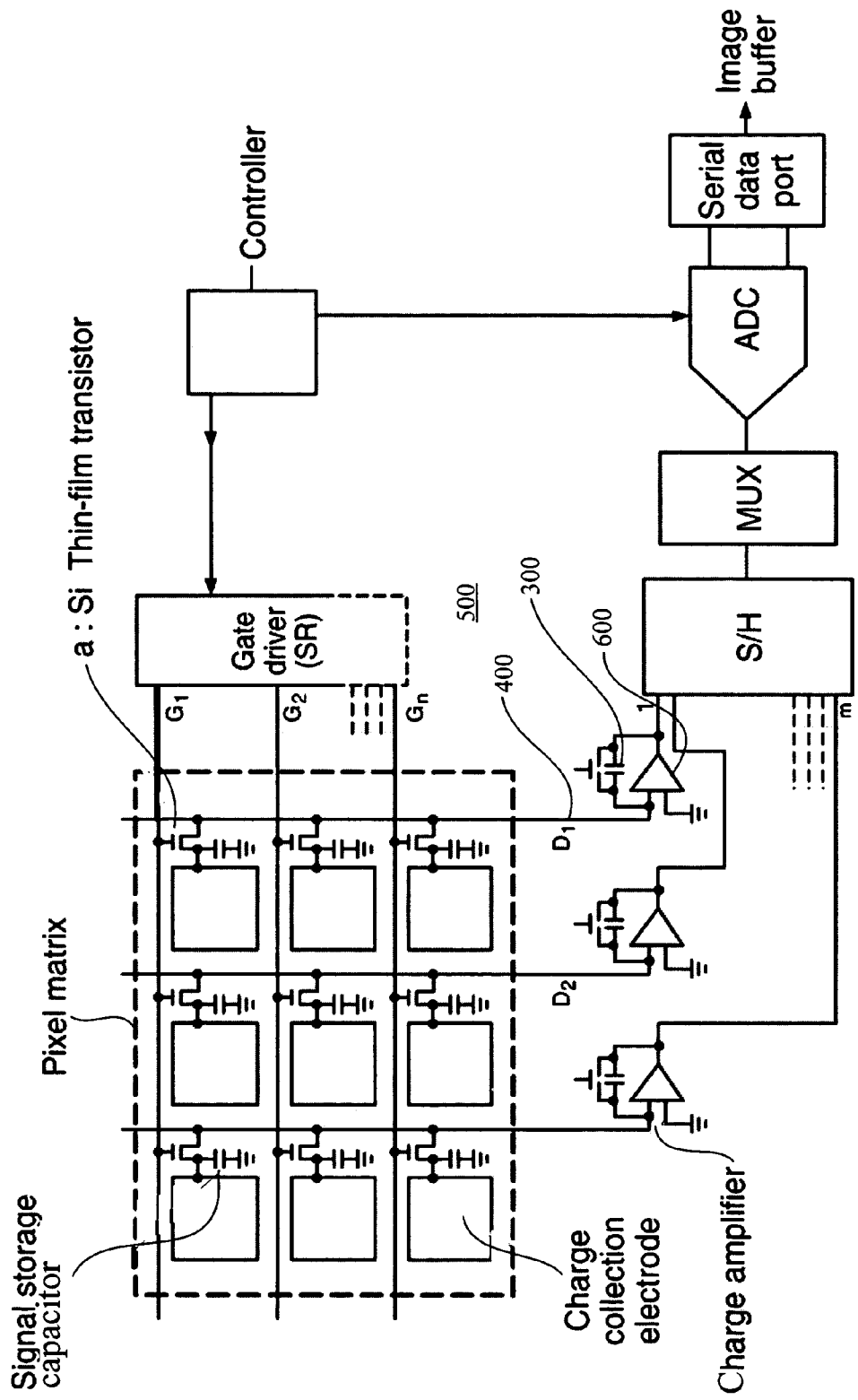
FIG. 7 shows the schematic of a readout peripheral circuit.

FIG. 5 consists of a gate addressing line 112, a data line 110, a ground line 120, a bottom ITO (indium-tin oxide) layer 124 connected to the ground line 120 through a via hole 122, a top ITO (indium-tin oxide) layer 126 insulated from the bottom ITO by an insulating layer or a plurality of layers, and the bottom-gate thin film transistor 102. The structure of a bottom-gate thin film transistor 102 associated with each imaging element or pixel typically includes a source electrode 116 connected to the data line 110, a drain electrode 118 connected to the top ITO 126 through a via hole 123, a gate electrode 119 connected to the gate line 112, and a semiconductor layer formed by amorphous silicon or other semiconductor material. For example, the semiconductor layer is an island of thin-film amorphous silicon 114 electrically insulated from the gate electrode 119. A thin film transistor channel 130 (part of amorphous silicon island 114) exists between the source electrode 116 and the drain electrode 118. The gate electrode 119 is placed directly below the channel 130 with an electrically insulated layer (gate insulator) placed between the gate electrode 119 and the amorphous silicon island 114. The top ITO electrode 126 is electrically insulated from the gate line 112, the data line 110, and the ground line 120. The charges stored in the top ITO layer 126 can be detected by a peripheral circuit 500 (shown in the FIG. 7) connected to the data line 110 by turning the channel 130 into a conducting state.

Figure 4:
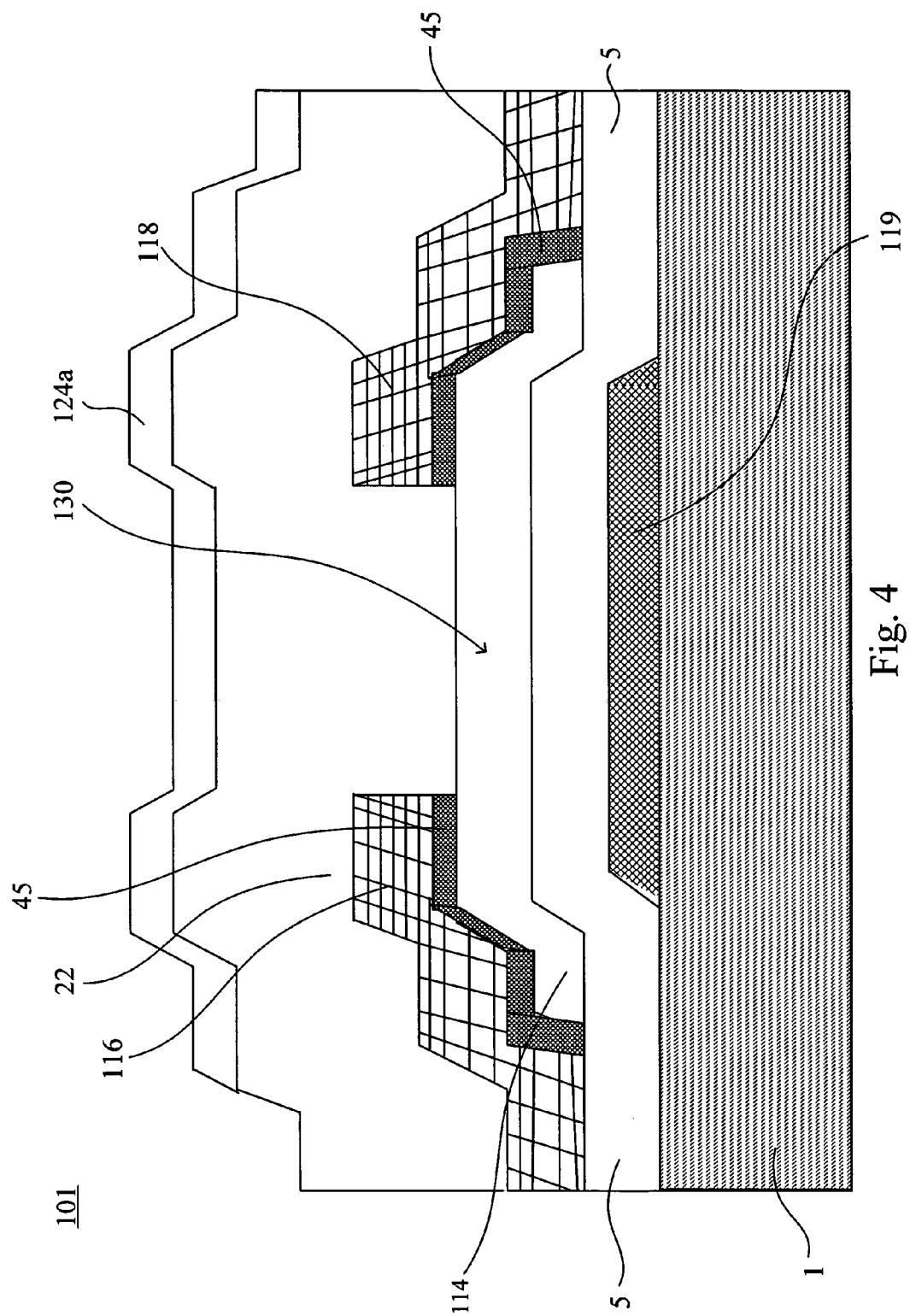
FIG. 4 describes a cross-sectional view of the thin film transistor of the prior art shown in FIG. 3.
Figure 6:
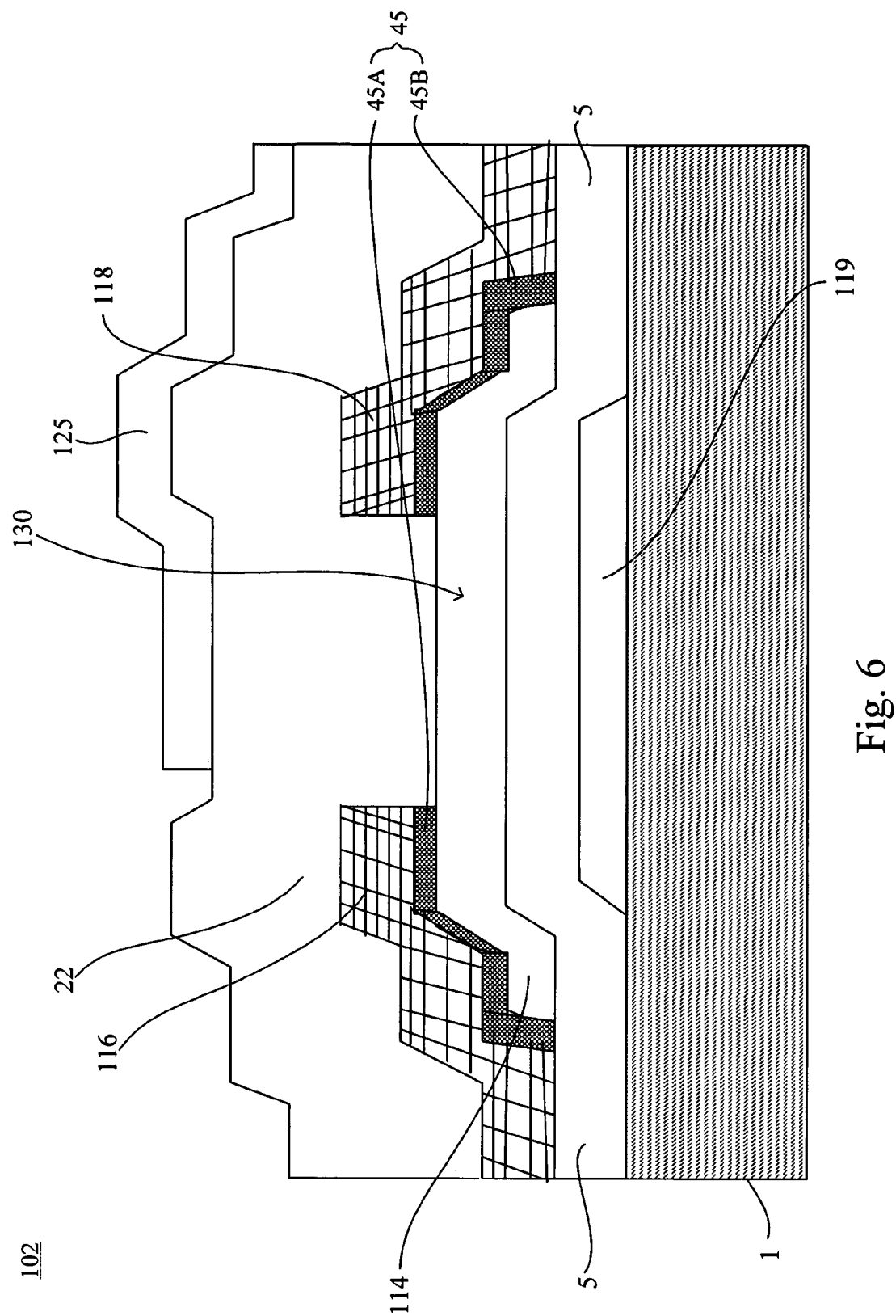
FIG. 6 shows a cross-sectional view of the shielded-junction thin film transistor of the present invention associated with FIG. 5.

The structure of the shielded-junction thin film transistor 102 shown in FIG. 6 is different from that of the thin film transistor 101 shown in FIG. 4 for a prior art. The structure of the shielded-junction thin film transistor 102 shown in FIG. 6 is a cross-sectional view of the thin film transistor along the line AB shown in FIG. 5. Please view FIG. 5 and FIG. 6 together. The gate electrode 119 is deposited on top of a supporting substrate preferably a glass plate 1. A gate insulating layer 5 and the amorphous silicon island 114 are deposited on top of the gate electrode 119. There exits a thin carrier-doped amorphous silicon layer 45, including first contact layer 45A and second contact layer 45B, between the silicon island 114 and both the drain electrode 118 and the source electrode 116 to form good ohmic contacts. There usually exits a dielectric passivation layer 22 covering the source electrode 116, the drain electrode 118, and the channel 130. Current flow through the thin film transistor between the source electrode 116 and the drain electrode 118 is controlled by a voltage applied to the gate electrode 119. On top of the passivation layer 22, there is an island of protection electrode 125 electrically insulated from the bottom ITO electrode 124. The protection electrode 125 covers part of the drain electrode 118 and its adjacent part of the thin film transistor channel 130. The Protection electrode 125 is connected to the gate line 112 through a via hole 127 (as shown in the FIG. 5). Since protection electrode 125 does not cover or overlap with the source electrode 116, it has a negligible contribution to the data-line capacitance.

In the thin film transistor 102 off state, both the gate electrode 119 and the Protection electrode 125 are negatively biased for n-type thin film transistors or positively-biased for p-type thin film transistors to prevent current from flowing through the drain electrode-to-semiconductor junction. The structure of the thin film transistor shown in FIGS. 5 and 6 is called as shielded-junction thin film transistor that has a low leakage current at the off-state as well as negligible contribution to the data-line capacitance.

The sequence of fabrication steps for a shielded-junction thin film transistor array shown in FIGS. 5 and 6 are described as follows. Normally, non-alkaline glass is used as a glass substrate (e.g. 0.5 mm, 0.63 mm, and 0.7 mm in thickness). After a glass substrate has been chemically cleaned in an ultrasonic bath, a metal layer or metal layers with a total thickness of below 500 nm (e.g. Cr, Mo/Ta, AlNd/Mo, MoW, Ti, Ti—Mo, Ta) is deposited by DC magnetron sputtering and chemically wet etched to form the gate electrodes 119. The lengths of the gate electrodes 119 is approximately equal to or larger than the corresponding width of the channel 130, and is typically from 3 to 20 microns.

Next, three layers: dielectric layer 5, amorphous silicon island 114, and carrier-doped amorphous layer 45, are deposited by PECVD (Plasma Enhanced Chemical Vapor Deposition) and dry etched by PE (plasma Etching) or RIE (Reactive Ion Etch) to form the pattern for the island of thin film transistor. The gate-insulator 5 has a typical thickness from about 100 to 800 nm and is typically made of silicon nitride or silicon oxide or silicon oxynitride or multi-layers of above three materials.

The hydrogenated amorphous silicon island 114 with a typical thickness from 50 nm to 500 nm is deposited by PECVD method with silane gas ($SiH_4$) and hydrogen diluting gas. The carrier-doped amorphous silicon layer 45 with a typical thickness from 30 nm to 100 nm is deposited with silane gas, hydrogen diluting gas and a doping gas such as phosphine or diborane, providing ohmic contacts between drain 118 and source 116 electrodes and the amorphous silicon island 114. Dangling bonds in amorphous silicon island 114 are neutralized by hydrogen atom, which enhances the electron mobility to values from 0.5 $cm^2$/Vs to 1 $cm^2$/Vs.

Then, a metal layer or metal layers (e.g. Cr, Cr/Al/Cr, Mo/Ta, Mo/Al/Mo) with a total thickness below about 500 nm or less is sputtered and chemically wet-etched to form the pattern for the drain electrode 118, the source electrode 116, and the data line 110. The patterns of metal serves as a mask for plasma etching of carrier-doped amorphous silicon layer 45 to remove exposed carrier-doped amorphous silicon layer 45. The length of channel 130 is typically from 2 to 10 microns.

Next, a PECVD passivation SiNx 22 of 100 nm to 500 nm in thickness is deposited and on its top an via hole 127 passing through the gate dielectric layer 5 and passivation SiNx 22 is formed. Another via hole 122 (as shown in the FIG. 5) is also formed simultaneously through the passivation SiNx 22. The ITO layer about 30 nm to 150 nm is, then, deposited and patterned to form a bottom ITO electrode 124 and an protection electrode 125 for covering the drain 118 and the channel 130, which are electrically insulated from each other. In another embodiments, the structure of the protection electrode 125 is single-layer metal structure or multi-layer metals structure. Indium-zinc-oxide material also can be used to replace the indium-tin-oxide material to form the protection electrode 125. The bottom ITO electrode 124 and protection electrode 125 are electrically connected to ground line 120 and gate electrode 119 through via holes 122 and 127, respectively. Another dielectric layer of about 100 nm to 600 nm (not shown in the figure) is deposited on top of the bottom ITO electrode 124, Protection electrode 125, the data line 110, the ground line 122 as well as the shielded-junction thin film transistor 102. Etching is carried out at the same time to open the bond pads for connection to peripheral circuitry (not shown in the figure) and contacts 123 (as shown in the FIG. 5) of drain electrodes. The top ITO electrode 126 of about 30 nm to 200 nm is, then, finally deposited and patterned to make an electrical contact to the drain electrode 118 through contacts 123.

The parameters of our preferred embodiment to obtain a shielded-junction thin film transistor shown in FIGS. 5 and 6 for an electromagnetic radiation imager were as follow. The gate electrodes 119 had approximately a length of about 20 microns and a width of about 12 microns for a pixel pitch of about 100 microns. Both the gate line 112 and gate electrode were made of Mo/Al(Nd)/Mo, a tri-layer metal film with a total thickness about 330 nm. The gate line 112 has a width of about 12 microns tapered to a width of about 5 microns at the intersection with the data line 110 to reduce the cross-over capacitance. Similar tapered-down for the gate line 112 at its cross section with ground line 120 is an option to reduce the gate-line delay. The tapered-down of data line 110 at the cross section to below 5 microns is also an option if future large-area photolithographic tool and process can make such fine resolution with high yield.

Figure 1:
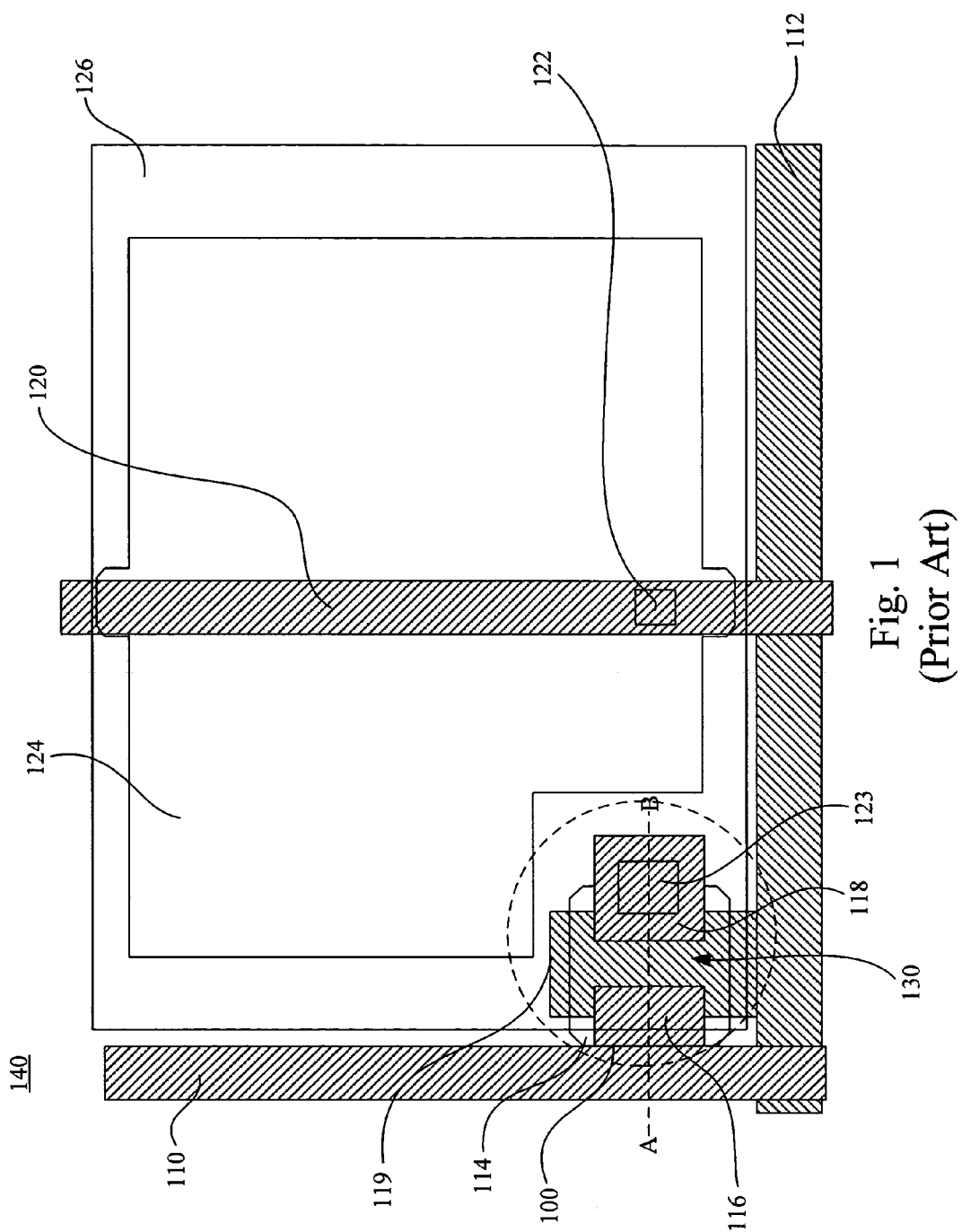
FIG. 1 depicts the scheme of a pixel layout of a thin film transistor array of prior art (the type of SAMURAI) that includes a thin film transistor, a data line, a gate line, a ground line, and two ITO (indium-tin oxide) layers to form a storage capacitor.
Figure 2:
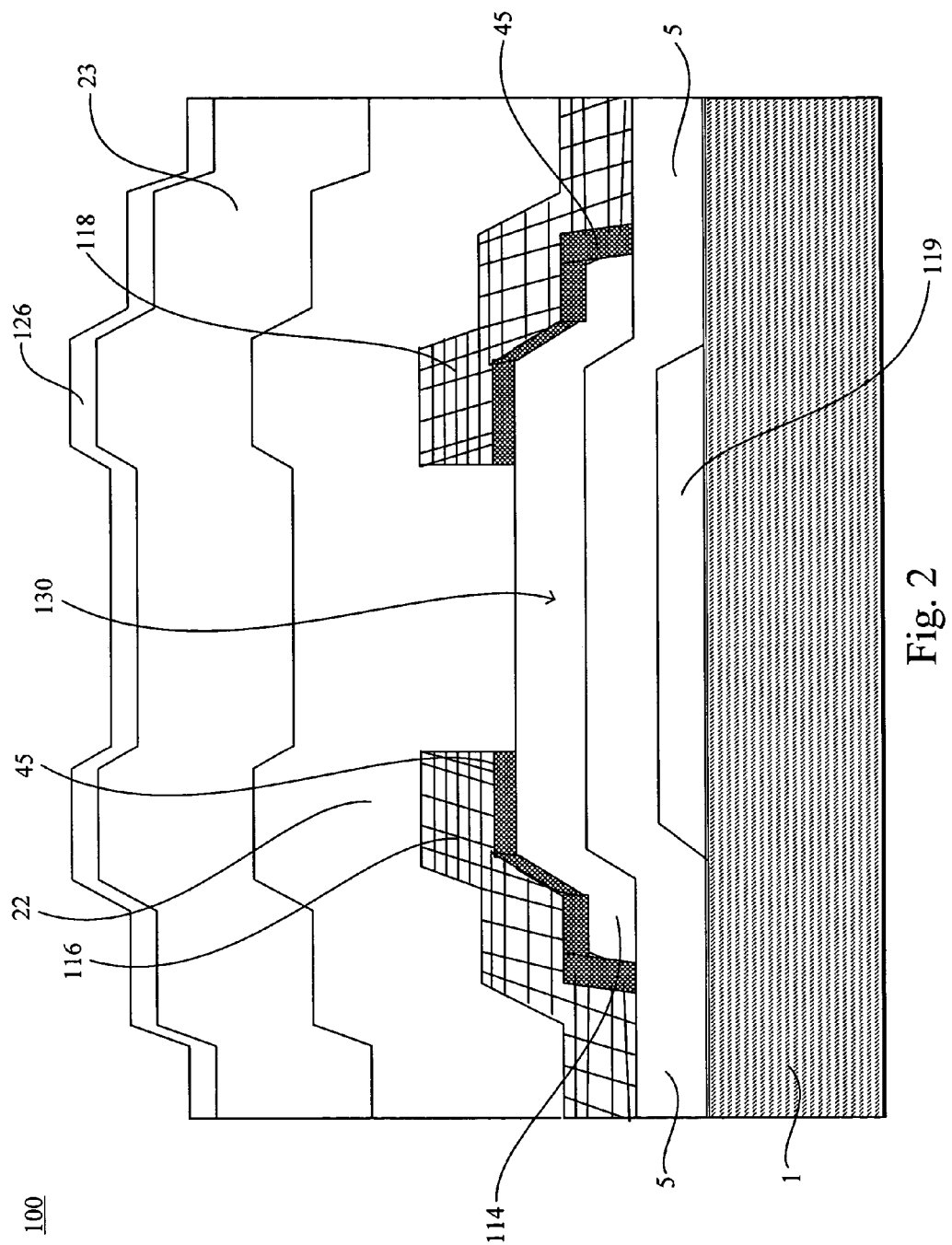
FIG. 2 describes a cross-sectional view of the thin film transistor of the prior art shown in FIG. 1.
Figure 3:
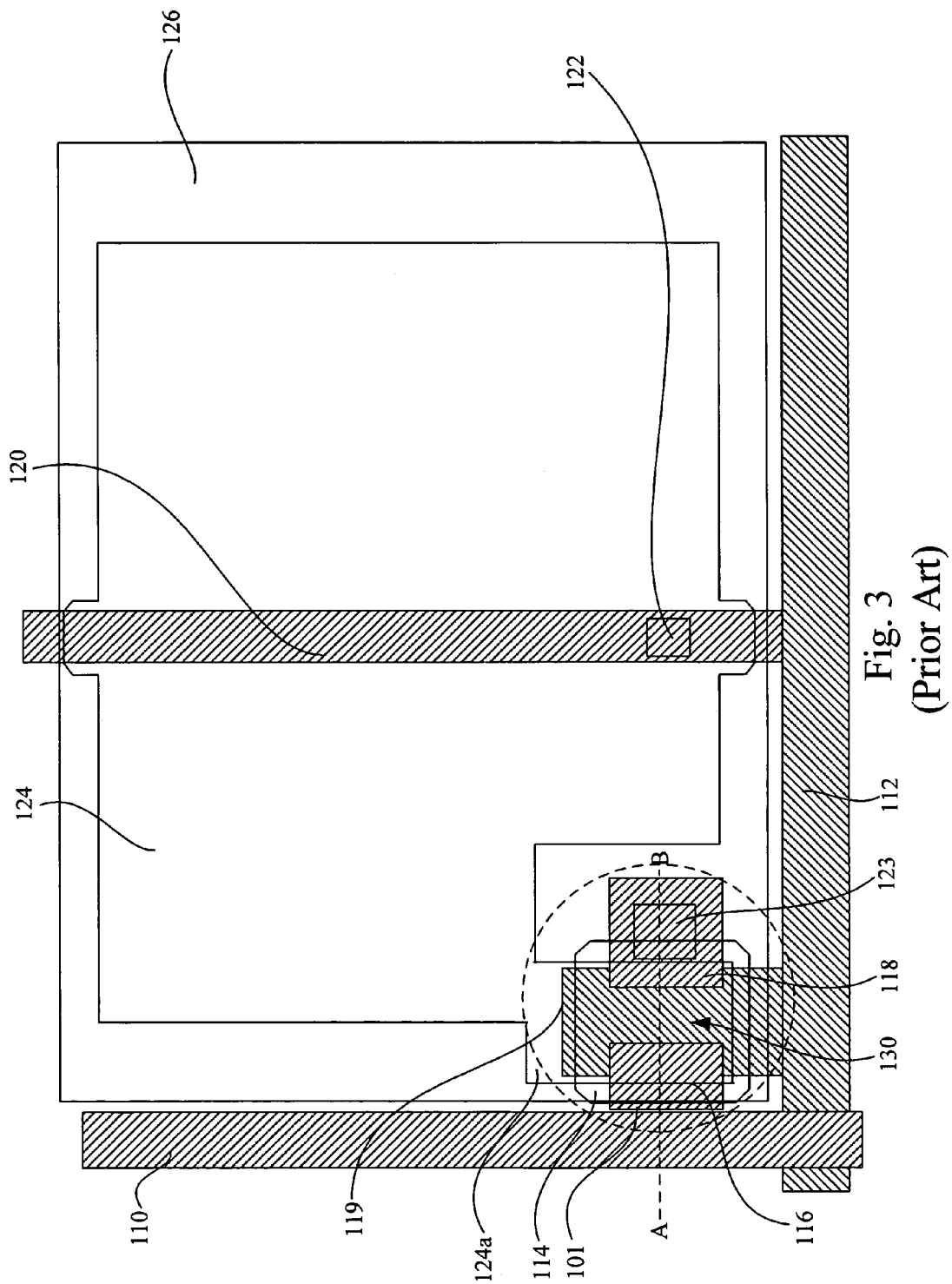
FIG. 3 depicts the scheme of a pixel layout of another prior art (Patent Application Publication US 2003/0010922 A1) that includes a thin film transistor, a data line, a gate line, a ground line, and two ITO (indium-tin oxide) layers to form a storage capacitor.

The insulator layer 5 was made of silicon nitride film with a thickness of about 300 nm. The amorphous silicon island 114 was made of an intrinsic amorphous silicon film with a thickness about 120 nm to 200 nm. The carrier-doped (or n+ doped) amorphous silicon layer 45 had a thickness of about 50 nm. The channel 130 had a length of approximately 5 microns, a width of about 12 microns, and a thickness of approximately 70 nm to 150 nm. The Protection electrode 125 of about 30 to 150 nm in thickness had a length of about 27 microns and a width of about 10 microns, and it had a lateral distance of about 2 to 4 microns from the source electrode 116. The estimated capacitance between the source electrode 116 and the Protection electrode 125 was below about $3.5 \times 10^{-15}$ F. The corresponding capacitance between the source electrode 116 and the ITO electrode 124a shown in FIGS. 3 and 4 for a prior art was about $15 \times 10^{-15}$ F. It represented an improvement more than 4 times using our preferred embodiment than that of the prior art described in Patent Application Publication US 2003/0010922 A1. The present invention can reduce the data line capacitor to improve the signal-to-noise ratio and reduce the image radiation. The passivation layer 22 had a thickness about 200 nm. The data line 110, the source electrode 116 and the drain electrode 118 were made of Mo/Al(Nd)/Mo or Mo/Al/Mo, a tri-layer metal film with a total thickness about 330 nm. The data line 110 had a width about 5 microns.

As is understood by a person skilled in the art, the foregoing descriptions of the preferred embodiment of the present invention are an illustration of the present invention rather than a limitation thereof. Various modifications and similar arrangements are included within the spirit and scope of the appended claims. The scope of the claims should be accorded to the broadest interpretation so as to encompass all such modifications and similar structures. While a preferred embodiment of the invention has been illustrated and described, it will be appreciated that various changes can be made therein without departing from the spirit and scope of the invention.

What is claimed is:

1. An electromagnet radiation imager structure, said structure comprising:
    a substrate;
        a plurality of data lines located on said substrate and arranged parallel to each other;
    a plurality of gate lines located on said substrate and arranged parallel to each other and cross said plurality of data lines, wherein said gate lines and said data lines define a plurality of pixels; and
    a plurality of thin film transistors located in said pixels respectively, wherein each of said thin film transistors comprises:
        a gate electrode located on said substrate_and connected with a corresponding gate line;
        an insulation layer located on said gate electrode;
        an semiconductor layer located on said insulation layer;
        first and second contact layer separately located on said semiconductor layer;
        a drain electrode located on said first contact layer and electrically connected with said semiconductor layer through said first contact layer, wherein said drain electrode connected to a part of a top layer of a storage capacitor;
        a source electrode located on said second contact layer and electrically connected with said semiconductor layer through said second contact layer, wherein a channel is formed in said semiconductor layer between said source electrode and said drain electrode;
        a passivation layer located on said drain electrode, said source electrode and said semiconductor layer; and
        a protection electrode located on said passivation layer for shielding said channel and said drain electrode, wherein said protection electrode is connected with said gate line.

2. The electromagnet radiation imager structure of claim 1, wherein application of a voltage to said gate electrode causes charge stored in said storage capacitor to be read out.

3. The electromagnet radiation imager structure of claim 1, wherein said protection electrode can be made from indium-tin-oxide.

4. The electromagnet radiation imager structure of claim 1, wherein said protection electrode can be made from indium zinc oxide.

5. The electromagnet radiation imager structure of claim 1, wherein said protection electrode has a single-layer metal structure.

6. The electromagnet radiation imager structure of claim 1, wherein said protection electrode has a multi-layer metals structure.

7. The electromagnet radiation imager structure of claim 1, wherein said first and second contact layer are phosphorus doped amorphous silicon layers.

8. The electromagnet radiation imager structure of claim 1, wherein said_semiconductor layer is an amorphous silicon island.

9. The electromagnet radiation imager structure of claim 1, wherein said protection electrode has a thickness from 30 nm to 150 nm.

10. The electromagnet radiation imager structure of claim 1, wherein the material for making said gate electrode is selected from the groups consisting of Cr, Mo/Ta, AlNd/Mo, MoW, Ti, Ti—Mo and Ta.

11. The electromagnet radiation imager structure of claim 1, wherein each of said pixels further comprises a ground line located in a location away from corresponding thin film transistor, wherein said ground line is arranged in parallel to the data line and crosses a corresponding gate line.

12. The electromagnet radiation imager structure of claim 11, wherein each of said pixels further comprises a bottom electrode connected with said ground line.

13. The electromagnet radiation imager structure of claim 1, wherein said pixel region further comprises a top electrode connected with said drain electrode.

14. The electromagnet radiation imager structure of claim 1, wherein said substrate is a glass substrate.

15. A fabricating shielded-junction thin film transistor method, wherein said thin film transistor is formed in a substrate, said method comprising:
    forming a gate electrode on said substrate, wherein said gate electrode connects with a corresponding gate line;
    forming an insulation layer on said gate electrode;
    forming an semiconductor layer on said insulation layer;
    forming separately first and second contact layer on said semiconductor layer;
    forming a drain electrode on said first contact layer, wherein said drain electrode electrically connects with said semiconductor layer through said first contact layer;
    forming a source electrode on said second contact layer, wherein said source electrode electrically connects with said semiconductor layer through said second contact layer and a channel is formed in said semiconductor layer between said source electrode and said drain electrode;
    forming a passivation layer on said drain electrode, said source electrode and said semiconductor layer; and
    forming a protection electrode on said passivation layer for shielding said channel and said drain electrode, wherein said protection electrode electrically connect with said gate line.

16. The fabricating shielded-junction thin film transistor method of claim 15, wherein said protection electrode can be made from indium-tin-oxide.

17. The fabricating shielded-junction thin film transistor method of claim 15, wherein said protection electrode can be made from indium zinc oxide.

18. The fabricating shielded-junction thin film transistor method of claim 15, wherein said first and second contact layer are phosphorus doped amorphous silicon layers.

19. The fabricating shielded-junction thin film transistor method of claim 15, wherein said protection electrode has a thickness from 30 nm to 150 nm.

20. The fabricating shielded-junction thin film transistor method of claim 15, wherein said protection electrode has a single-layer metal structure.

21. The fabricating shielded-junction thin film transistor method of claim 15, wherein said protection layer has a multi-layer metals structure.

22. The fabricating shielded-junction thin film transistor method of claim 15, wherein said substrate is a glass substrate.

23. The fabricating shielded-junction thin film transistor method of claim 15, wherein a plasma enhanced chemical vapor deposition (PECVD) method is used to form said semiconductor layer.

24. The fabricating shielded-junction thin film transistor method of claim 15, wherein a plasma enhanced chemical vapor deposition (PECVD) method is used to form said first and second contact layer.

25. The fabricating shielded-junction thin film transistor method of claim 15, wherein the material for making said gate electrode is selected from the groups consisting of Cr, Mo/Ta, AlNd/Mo, MoW, Ti, Ti—Mo and Ta.

26. The fabricating shielded-junction thin film transistor method of claim 15, wherein said semiconductor is an amorphous silicon island.

* * * * *